United States Patent Office 3,456,998
Patented July 22, 1969

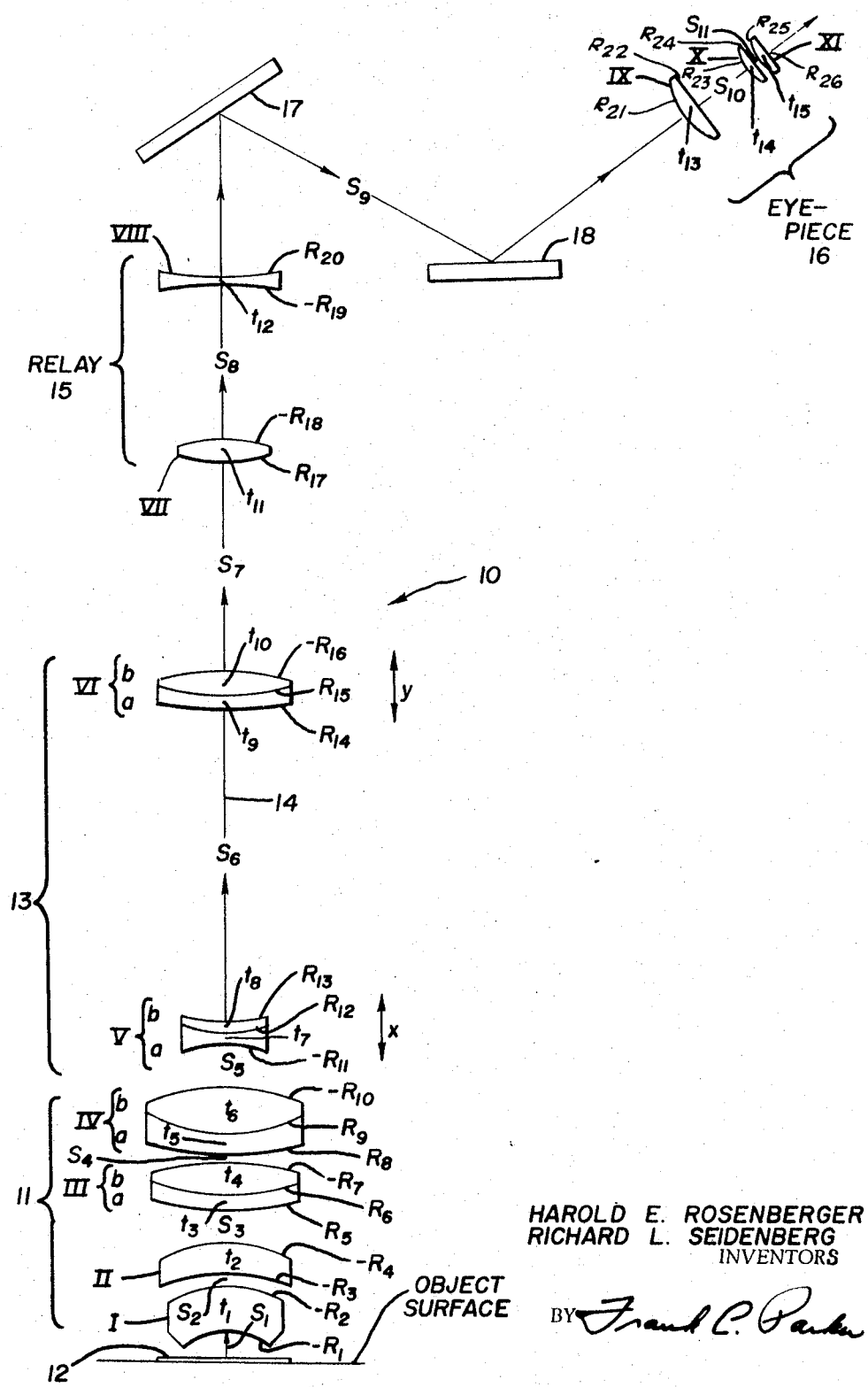

3,456,998
ZOOM TYPE OPTICAL SYSTEM FOR MICROSCOPE
Harold E. Rosenberger, Brighton, and Richard L. Seidenberg, Rochester, N.Y., assignors to Bausch & Lomb Incorporated, Rochester, N.Y., a corporation of New York
Filed Apr. 7, 1967, Ser. No. 629,175
Int. Cl. G02b 7/10, 15/14
U.S. Cl. 350—40                                6 Claims

ABSTRACT OF THE DISCLOSURE

A low cost student microscope designed to provide by axial movement of two lenses a continuous variation in image magnification over a range from substantially 100× to 500× while maintaining a uniformly good image.

Cross references to related applications

Application of Harold E. Rosenberger, S. N. 423,101, filed Jan. 4, 1965, now Patent No. 3,360,327.

Background of the invention

The zoom optical system disclosed hereinafter is a complex optical system forming a part of a microscope or kindred device; said system being an integrated lens system wherein is provided in optical alignment with each other a microscope objective, a zoom lens system for varying the focal length of the system, an optical relay system next in order and an eyepiece for presenting an image of a microscopical object in constant focus at all magnifications of the system throughout a continuous magnification range of substantially 5.

An example of the closest known prior art is the application of H. E. Rosenberger et al., S. N. 423,101 filed Jan. 4, 1965, now Patent No. 3,360,327, and having the same assignee as the instant application. In this earlier work of Rosenberger, the foremost or front group of lenses known as the "objective" is *movable* to change focal length and is provided with a front aperture plate which moves with the objective to change the numerical aperture. Although optically, such an optical system is excellent, the mechanical motion mechanism is difficult to produce with the required degree of accuracy and is much too expensive for low cost microscopes such as those used in secondary schools.

Summary of the invention

The present invention relates to an optical lens system for a microscope and more particularly it relates to improvements in the structure and arrangement of the optical parts of a zoom lens system having a continuous magnification variation of substantially 100× to 500×.

It is an object of the present invention to provide a novel zoom optical system in the magnification range of substantially 100× to 500× which is constructed most favorably for actuation by low angle cam structures.

It is a further object to provide such a device which is capable of high grade optical performance but which may be manufactured at relatively low cost, particularly in view of the fact that an excellent flat field is produced along with good correction of the chromatic and monochromatic aberrations.

A further object is to provide such a device wherein the relative apertures at most positions of the zoom lenses are considerably increased for the range of magnification given hereabove.

Further objects and advantages will be found in the details of construction and combination of parts which is described in the following specification taken in connection with the accompanying drawing.

Brief description of the drawing

The single figure of the drawing is an optical diagram illustrating a preferred form of the present invention.

Description of a preferred embodiment

With reference to said preferred embodiment of the present invention, there is provided a complete optical lens system which is generally indicated by numeral 10. Comprised in said lens system 10 is a front stationary objective lens group 11 which is spaced away from a specimen cover glass surface 12 at a distance designated $S_1$. Lens system 10 is further comprised of a zoom lens system 13 which is optically aligned with lens group 11 on the broken optical axis 14, the lenses of which are axially spaced therefrom by variable airspaces $S_5$ and $S_6$, the zoom system serving to vary the focal length of the lens system 10. Next, rearwardly, the lens system 10 comprises a relay lens group 15 which is stationary and is aligned on optical axis 14 with zoom lens group 13. Lastly is provided an eyepiece lens group 16 which is aligned on the broken axis 14 with relay lens group 15 at a constant axial distance designated $S_9$ so as to form in cooperation with the other groups 15, 13 and 11 an image of variable magnification for observation by the operator.

A pair of deflection mirrors 17 and 18 are provided for inclining the eyepiece 16 at a comfortable viewing angle.

Included in the objective lens group 11 is a front positive meniscus lens designated I and rearwardly thereof a second positive meniscus lens II which are separated from each other by an axial distance denoted by $S_2$. The axial thicknesses of lenses I and II are designated respectively $t_1$ and $t_2$. At an axial distance $S_3$ rearwardly of lens II, is located a pair of positive doublet lens members III and IV having respectively negative elements IIIa and IVa, and also having contacting positive elements IIIb and IVb, said lenses being spaced from each other at an axial distance $S_4$, the axial thickness of lens elements IIIa, IIIb, IVa and IVb are designated respectively $t_3$, $t_4$, $t_5$, and $t_6$.

In the zoom lens group 13, the front lens member V is movable axially so that $S_5$ varies and said member is composed of a double concave front lens element Va which lies in contact with a rear positive meniscus lens element Vb. At a variable axial distance $S_6$ rearwardly thereof is located the doublet positive lens member VI having a front negative meniscus lens element VIa which lies against a rear positive lens element VIb. The movement of lenses V and VI is indicated by the adjacent arrows "X" and "Y."

Still further rearwardly in optical alignment on axis 14 from lens VI, lies the stationary relay lens group 15 consisting of a front positive singlet lens member VII and a rear negative singlet lens VIII, lenses VII and VIII being separated by a constant axial distance $S_8$ and having axial thicknesses $t_{11}$ and $t_{12}$ respectively.

Image rays leaving lens VIII are deflected successively by flat mirrors 17 and 18 into the eyepiece 16, the intervening constant axial dimension being denoted $S_9$. Comprised in said eyepiece 16 is a front plano convex lens IX having an axial thickness $t_{13}$ and a pair of rear plano convex lenses X and XI, lens X being spaced at an axial distance $S_{10}$ from lens IX and at an axial distance $S_{11}$ from the rearmost lens.

Having the optical system 10 as described hereabove, the optical parameters given herebelow are so calculated and positioned as to produce a numerical aperture which is commensurate with the magnification through the entire zooming range, the numerical aperture increasing from 0.15 to 0.55 as the magnification changes from substantially 100× to 500×.

According to the present invention it is not only the form, combination and arrangement of the lens members I to XI that provides an advance in the art, but more importantly it is the relative and specific values of the constructional and optical parameters thereof which differentiate from the prior art. Calculation and experiment by the inventors has provided a set of values for said parameters whereby the objects of the invention are fulfilled and said values are set forth in the several tables given herebelow.

With regard to the ranges of values given in certain parts of the tables herebelow, it should be realized that every range of values includes a median nominal or ideal value. The reason for stating said values in ranges is to match the parameters of dimension actually used in manufacturing the elements of the lens system as set forth herebelow.

It is well known in the optical arts that it is practically impossible to manufacture a production run of lens elements economically while holding all of the lens parameters to specific or substantially ideal values. Therefore the lens designer specifies tolerances or ranges of values for each lens parameter within which the lens elements may be manufactured economically while at the same time enabling the optician to assembly a completed objective which is capable of good optical performance. The technique used by the manufacturer is to separate out or classify the lens elements according to arbitrary ranges of values of the parameters and then selectively assemble from such elements a complete optical system. This technique is highly successful in producing economically a good optical system from said elements.

In Table I herebelow the values are given in terms of F, which is the equivalent focal length of the stationary objective lens group 11, and in ranges of values for: the equivalent focal lengths F (I) to F (XI) of the respective lens elements I to XI respectively, the minus (—) sign used with certain values meaning negative focal length; the successive axial thicknesses $t_1$ to $t_{15}$ of said elements, and the successive axial airspaces $S_1$ to $S_{11}$, numbering from the front of system 10.

TABLE I 1.80F<F (I)<1.87F
3.54F<F (II)<3.70F
6.26F<F (III)<6.54F
5.18F<F (IV)<5.40F
1.95F<—F (V)<2.03F
5.84F<F (VI)<6.08F
13.08F<F (VII)<13.62F
11.72F<—F (VIII)<12.26F
4.32F<F (IX)<4.54F
3.32F<F (X)<3.44F
3.32F<F (XI)<3.47F

.585F<(I) $t_1$<.595F
.273F<(II) $t_2$<.287F
.170F<(IIIa) $t_3$<.190F
.350F<(IIIb) $t_4$<.370F
.170F<(IVa) $t_5$<.190F
.460F<(IVb) $t_6$<.480F
.120F<(Va) $t_7$<.140F
.170F<(Vb) $t_8$<.190F
.140F<(VIa) $t_9$<.160F
.270F<(VIb) $t_{10}$<.290F
.189F<(VII) $t_{11}$<.231F
.138F<(VIII) $t_{12}$<.182F
.289F<(IX) $t_{13}$<.331F
.168F<(X) $t_{14}$<.212F
.168F<(XI) $t_{15}$<.212F

.301F<$S_1$<.310F
.0314F<$S_2$<.0374F
.298F<$S_3$<.312F
.0333F<$S_4$<.0543F

.545F<$S_5$ (102×)<.565F
3.015F<$S_5$ (200×)<3.045F
3.76F<$S_5$ (300×)<3.80F
4.33F<$S_5$ (500×)<4.37F
4.12F<$S_6$ (102×)<4.16F
3.31F<$S_6$ (200×)<3.33F
2.43F<$S_6$ (300×)<2.47F
.82F<$S_6$ (500×)<.84F
3.09F<$S_7$ (102×)<3.12F
1.36F<$S_7$ (200×)<1.38F
1.47F<$S_7$ (300×)<1.50F
2.52F<$S_7$ (500×)<2.56F 2.00F<$S_8$<2.04F
14.02F<$S_9$<14.57F
3.02F<$S_{10}$<3.15F
.0052<$S_{11}$<.0156F

The ranges of absolute values for the refractive indices and the Abbe numbers which are designated $n_D$ and $v$ respectively and which are related to the successive lens elements I and XI are given in the Table II herebelow.

TABLE II

| Element | $n_D$ | $v$ |
|---|---|---|
| I | 1.618 to 1.622 | 59.8 to 60.8 |
| II | 1.513 to 1.515 | 69.7 to 70.7 |
| IIIa | 1.689 to 1.693 | 30.4 to 31.0 |
| IIIb | 1.513 to 1.515 | 69.7 to 70.7 |
| IVa | 1.718 to 1.722 | 29.1 to 29.5 |
| IVb | 1.513 to 1.515 | 69.7 to 70.7 |
| Va | 1.621 to 1.625 | 56.4 to 57.4 |
| Vb | 1.749 to 1.753 | 27.6 to 28.0 |
| VIa | 1.689 to 1.693 | 30.4 to 31.0 |
| VIb | 1.522 to 1.524 | 54.6 to 55.6 |
| VII | 1.618 to 1.622 | 59.8 to 60.8 |
| VIII | 1.540 to 1.542 | 46.9 to 47.7 |
| IX | 1.749 to 1.753 | 27.6 to 28.0 |
| X and XI | 1.515 to 1.518 | 64.0 to 65.0 |

The ranges of values in terms of F for the successive radii designated —$R_1$ to $R_{26}$ of the lenses I to XI are given in the Table III herebelow wherein the minus (—) sign means that the designated surface is concave toward the front.

TABLE III

.911F<—$R_1$<.922F
.633F<—$R_2$<.635F
2.706F<—$R_3$<2.726F
1.142F<—$R_4$<1.144F
5.441F<$R_5$<5.499F
1.533F<$R_6$<1.536F
3.506F<—$R_7$<3.524F
4.453F<$R_8$<4.481F
1.373F<$R_9$<1.375F
2.864F<—$R_{10}$<2.878F
1.975F<—$R_{11}$<1.998F
.984F<$R_{12}$<.988F
2.414F<$R_{13}$<2.450F
17.282F<$R_{14}$<18.282F
2.758F<$R_{15}$<2.776F
2.758F<—$R_{16}$<2.776F
16.286F<$R_{17}$<16.752F
16.286F<—$R_{18}$<16.752F
12.856F<—$R_{19}$<13.146F
12.856F<$R_{20}$<13.146F
3.323F<$R_{21}$<3.329F
1.743F<$R_{23}$, $R_{25}$<1.749F

More explicity, the values are given for the various above mentioned constructional parameters in Tables IV, V, VI, VII and VIII herebelow.

The equivalent focal length of each successive lens from I to XI being designated by F (I) to F (XI) respectively and being stated substantially in specific values in terms of F which represents the equivalent focal length of the stationary lens group I to IV per se, in Table IV herebelow, the minus (—) sign therein meaning negative focal length,

TABLE IV

| | |
|---|---|
| F (I) = 1.84F | F (Vb) = 2.10F |
| F (II) = 3.62F | F (VI) = 5.96F |
| F (III) = 6.40F | —F (VIa) = 4.76F |
| —F (IIIa) = 3.15F | F (VIb) = 2.69F |
| F (IIIb) = 2.13F | F (VII) = 13.35F |
| F (IV) = 5.29F | —F (VIII) = 11.99F |
| —F (IVa) = 2.82F | F (IX) = 4.43F |
| F (IVb) = 1.88F | F (X) = 3.38F |
| —F (V) = 1.99F | F (XI) = 3.38F |
| —F (Va) = 1.04F | |

The specific values in terms of F for the successive axial airspaces $S_1$ to $S_{11}$ lens system 10 are given substantially in the Table V herebelow,

TABLE V

| | |
|---|---|
| | $S_1 = .305F$ |
| | $S_2 = .0344F$ |
| | $S_3 = .305F$ |
| | $S_4 = .0438F$ |
| (102×) | $S_5 = .555F$ |
| (200×) | $S_5 = 3.03F$ |
| (300×) | $S_5 = 3.78F$ |
| (500×) | $S_5 = 4.35F$ |
| (102×) | $S_6 = 4.14F$ |
| (200×) | $S_6 = 3.32F$ |
| (300×) | $S_6 = 2.45F$ |
| (500×) | $S_6 = .833F$ |
| (102×) | $S_7 = 3.11F$ |
| (200×) | $S_7 = 1.37F$ |
| (300×) | $S_7 = 1.49F$ |
| (500×) | $S_7 = 2.54F$ |
| | $S_8 = 2.017F$ |
| | $S_9 = 14.293F$ |
| | $S_{10} = 3.085F$ |
| | $S_{11} = .0104F$ |

The specific values in terms of F for the axial thicknesses which as designated $t_1$ to $t_{15}$ of the successive lens elements I to XI are given in the Table VI herebelow,

TABLE VI

| | |
|---|---|
| (I) $t_1 = .59F$ | (VIa) $t_9 = .15F$ |
| (II) $t_2 = .28F$ | (VIb) $t_{10} = .28F$ |
| (IIIa) $t_3 = .18F$ | (VII) $t_{11} = .21F$ |
| (IIIb) $t_4 = .36F$ | (VIII) $t_{12} = .16F$ |
| (IVa) $t_5 = .18F$ | (IX) $t_{13} = .31F$ |
| (IVb) $t_6 = .47F$ | (X) $t_{14} = .19F$ |
| (Va) $t_7 = .13F$ | (XI) $t_{15} = .19F$ |
| (Vb) $t_8 = .18F$ | |

The specific absolute values for the refractive indices and Abbé number which are designated $n_D$ and $\nu$ respectively, which are related to the successive lens elements I to XI and are given substantially in the Table VII herebelow,

TABLE VII

| | |
|---|---|
| $n_D$ (I) = 1.620 | $\nu$ (I) = 60.3 |
| $n_D$ (II) = 1.514 | $\nu$ (II) = 70.2 |
| $n_D$ (IIIa) = 1.691 | $\nu$ (IIIa) = 30.7 |
| $n_D$ (IIIb) = 1.514 | $\nu$ (IIIb) = 70.2 |
| $n_D$ (IVa) = 1.720 | $\nu$ (IVa) = 29.3 |
| $n_D$ (IVb) = 1.514 | $\nu$ (IVb) = 70.2 |
| $n_D$ (Va) = 1.623 | $\nu$ (Va) = 56.9 |
| $n_D$ (Vb) = 1.7506 | $\nu$ (Vb) = 27.8 |
| $n_D$ (VIa) = 1.691 | $\nu$ (VIa) = 30.7 |
| $n_D$ (VIb) = 1.5235 | $\nu$ (VIb) = 55.1 |
| $n_D$ (VII) = 1.620 | $\nu$ (VII) = 60.3 |
| $n_D$ (VIII) = 1.541 | $\nu$ (VIII) = 47.3 |
| $n_D$ (IX) = 1.7506 | $\nu$ (IX) = 27.8 |
| $n_D$ (X, XI) = 1.517 | $\nu$ (X, XI) = 64.5 |

TABLE VIII

| Lens I | |
|---|---|
| —$R_2 = .634F$ | —$R_1 = .916F$ |
| Lens II | |
| —$R_3 = 2.716F$ | —$R_4 = 1.143F$ |
| Lens III | |
| $R_5 = 5.470F$ | —$R_7 = 3.515F$ |
| $R_6 = 1.534F$ | |
| Lens IV | |
| $R_8 = 4.467F$ | —$R_{10} = 2.871F$ |
| $R_9 = 1.374F$ | |
| Lens V | |
| —$R_{11} = 1.986F$ | $R_{13} = 2.432F$ |
| $R_{12} = 0.986F$ | |
| Lens VI | |
| $R_{14} = 17.782F$ | —$R_{16} = 2.767F$ |
| $R_{15} = 2.767F$ | |
| Lens VII | |
| $R_{17} = 16.519F$ | —$R_{18} = 16.519F$ |
| Lens VIII | |
| —$R_{19} = 13.001F$ | $R_{20} = 13.001F$ |
| Lens IX | |
| $R_{21} = 3.326F$ | $R_{22} =$ Plano |
| Lens X | |
| $R_{23} = 1.746F$ | $R_{24} =$ Plano |
| Lens XI | |
| $R_{25} = 1.746F$ | $R_{26} =$ Plano |

The optical system 10 as above described and having constructional data as specified in Tables IV, V, VI, VII and VIII has an unusually large numerical aperture of the order of .15 to .55 when the zoom lenses V and VI are moved from the lower end of their range to the higher end.

Although only one particular form of the present invention has been shown and described, variations to some extent may be made in the form and arrangement of its parts and in the constructional parameters within the limits stated without departing from the spirit of the invention as defined in the claims appended hereto.

We claim:

1. A zoom type optical system for a microscope including a front stationary lens group having a focal length per se designated by F,
   - a movable zoom lens group for continuously varying the magnification of the image formed by the first group, said movable group located next in order to the front group,
   - a stationary relay lens group located to receive the image rays from the zoom lens group, and
   - an eyepiece for focusing said rays and presenting a visible image to the operator,
   - the successive lens groups cooperatively forming an image of variable size from substantially 100× to 500× having excellent imaging quality, particularly with regard to flatness of field and the chromatic and monochromatic aberrations thereof,
   - said front stationary lens group comprising a foremost positive meniscus lens designated I which is spaced away from an adjacent specimen cover glass surface at an axial distance designated $S_1$ and is followed by a second positive meniscus lens II, the intervening axial distance being designated $S_2$, a first positive doublet lens III spaced at an axial distance $S_3$ from lens II and a second positive doublet lens IV spaced at an axial distance $S_4$ from lens III, doublet lens III being composed of a front negative element IIIa which lies in contact with a rear positive element III$b$, and doublet lens IV having a front negative element IV$a$ and rear positive element IV$b$, said zoom lens group comprising a negative doublet lens designated V located at a variable axial distance $S_5$ from lens IV, and a positive doublet lens designated VI located at a variable axial distance $S_6$ from lens V, doublet lens V having a front negative element V$a$ lying in contact with a positive rear element V$b$, and the doublet lens VI being composed of a front negative element VI$a$ and a rear positive element VI$b$, said stationary relay lens group comprising a positive lens VII which is spaced at a variable axial distance $S_7$ from lens VI and further comprises a negative lens VIII spaced at a fixed axial distance $S_8$ from lens VII, said eyepiece comprising a front convex plano lens IX spaced rearwardly of lens VIII at an axial distance $S_9$, and further comprising a pair of similar convex plano lenses X and XI, lens X being spaced at an axial distance $C_{10}$ from lens IX and being spaced from lens XI at a distance $S_{11}$, the equivalent focal length of each successive lens from I to XI being designated by F (I) to F (XI) respectively and being stated in ranges of values in terms of F which represents the equivalent focal length of the stationary lens group I to IV per se, in the table herebelow, the minus (−) sign therein meaning negative focal length, $1.80F < F\ (I) < 1.87F$
$3.54F < F\ (II) < 3.70F$
$6.26F < F\ (III) < 6.54F$
$5.18F < F\ (IV) < 5.40F$
$1.95F < -F\ (V) < 2.03F$
$5.84F < F\ (VI) < 6.08F$
$13.08F < F\ (VII) < 13.62F$
$11.72F < -F\ (VIII) < 12.26F$
$4.32F < F\ (IX) < 4.54F$
$3.32F < F\ (X) < 3.44F$
$3.32F < F\ (XI) < 3.47F$ the ranges of values in terms of F for the axial thicknesses designated $t_1$ to $t_{15}$ of the successive lens elements of the respective lenses I to XI being given in the table below, $.585F < (I)\ t_1 < .595F$
$.273F < (II)\ t_2 < .287F$
$.170F < (IIIa)\ t_3 < .190F$
$.350F < (IIIb)\ t_4 < .370F$
$.170F < (IVa)\ t_5 < .190F$
$.460F < (IVb)\ t_6 < .480F$
$.120F < (Va)\ t_7 < .140F$
$.170F < (Vb)\ t_8 < .190F$
$.140F < (VIa)\ t_9 < .160F$
$.270F < (VII)\ t_{10} < .290F$
$.189F < (VII)\ t_{11} < .231F$
$.138F < (VIII)\ t_{12} < .182F$
$.289F < (XI)\ t_{13} < .331F$
$.168F < (X)\ t_{14} < .212F$
$.168F < (XI)\ t_{15} < .212F$ the range of values in terms of F for said successive axial spaces $S_1$ to $S_{11}$ being given in the table herebelow, $.301F < S_1 < .310F$
$.031F < S_2 < .0374F$
$.298F < S_3 < .312F$
$.0333F < S_4 < .0543F$
$.545F < S_5\ (102\times) < .565F$
$3.015F < S_5\ (200\times) < 3.045F$
$3.76F < S_5\ (300\times) < 3.80F$
$4.33F < S_5\ (500\times) < 4.37F$
$4.12F < S_6\ (102\times) < 4.16F$
$3.31F < S_6\ (200\times) < 3.33F$
$2.43F < S_6\ (300\times) < 2.47F$
$.82F < S_6\ (500\times) < .84F$
$3.09F < S_7\ (102\times) < 3.12F$
$1.36F < S_7\ (200\times) < 1.38F$
$1.47F < S_7\ (300\times) < 1.50F$
$2.52F < S_7\ (500\times) < 2.56F$
$2.00F < S_8 < 2.04F$
$14.02F < S_9 < 14.57F$
$3.02F < S_{10} < 3.15F$
$.0052F < S_{11} < .0156F$ 2. A zoom type optical system for a microscope according to claim 1 further characterized by
the equivalent focal lengths of the negative elements −F (III$a$), −F (IV$a$), −F (V$a$), and −F (VI$a$) having a range of values as stated herebelow, $3.08F < -F\ (IIIa) < 3.22F$
$2.77 < -F\ (IVa) < 2.88F$
$1.02F < -F\ (Va) < 1.06F$
$4.66F < -F\ (VIa) < 4.86F$ 3. A zoom type optical system for a microscope including a front stationary lens group having a focal length per se designated by F, a movable zoom lens group for continuously varying the magnification of the image formed by the first group, said movable group located next in order to the front group, a stationary relay lens group located to receive the image rays from the zoom lens group, and an eyepiece for focusing said rays and presenting a visible image to the operator, the successive lens groups cooperatively forming an image of variable size from substantially 100× to 500× having excellent imaging quality, particularly with regard to flatness of field and the chromatic and monochromatic aberrations thereof.

said front stationary lens group comprising a foremost positive meniscus lens designated I which is spaced away from an adjacent specimen cover glass surface at an axial distance being designated $S_1$ and is followed by a second positive meniscus lens II, the intervening axial distance being designated $S_2$, a first positive doublet lens III spaced at an axial distance $S_3$ from lens II and a second positive doublet lens IV spaced at an axial distance $S_4$ from lens III, doublet lens III being composed of a front negative element III$a$ which lies in contact with a rear positive element III$b$, and doublet lens IV having a front negative element IV$a$ and rear positive element IV$b$, said zoom lens group comprising a negative doublet lens designated V located at a variable axial distance $S_5$ from lens IV, and a positive doublet lens designated VI located at a variable axial distance $S_6$ from lens V, doublet lens V having a front negative element V$a$ lying in contact with a positive rear element V$b$, and the doublet lens VI being composed of a front negative element VI$a$ and a rear positive element VI$b$, said stationary relay lens group comprising a positive lens VII which is spaced at a variable axial distance $S_7$ from lens VI and further comprises a negative lens VIII spaced at a fixed axial distance $S_8$ from lens VII, said eyepiece comprising a front convex plano lens IX spaced rearwardly of lens VIII at an axial distance $S_9$, and further comprising a pair of similar convex plano lenses X and XI, lens X being spaced at an axial distance $S_{10}$ from lens IX and being spaced from lens XI at a distance $S_{11}$, the equivalent focal length of each successive lens from I to XI being designated by F (I) to F (XI) respectively and being stated in ranges of values in terms of F which represents the equivalent focal length of the stationary lens group I to IV per se, in the table herebelow, the minus (—) sign therein meaning negative focal length $$1.80F < F(I) < 1.87F$$
$$3.54F < F(II) < 3.70F$$
$$6.26F < F(III) < 6.54F$$
$$5.18F < F(IV) < 5.40F$$
$$1.95F < -F(V) < 2.03F$$
$$5.84F < F(VI) < 6.08F$$
$$13.08F < F(VII) < 13.62F$$
$$11.72F < -F(VIII) < 12.26F$$
$$4.32F < F(IX) < 4.54F$$
$$3.32F < F(X) < 3.44F$$
$$3.32F < F(XI) < 3.47F$$

the ranges of values in terms of F for the axial thicknesses designated $t_1$ to $t_{15}$ of the successive lens elements of the respective lenses I to XI being given in the table below, $$.585F < (I)\ t_1 < .595F$$
$$.273F < (II)\ t_2 < .287F$$
$$.170F < (IIIa)\ t_3 < .190F$$
$$.350F < (IIIb)\ t_4 < .370F$$
$$.170F < (IVa)\ t_5 < .190F$$
$$.460F < (IVb)\ t_6 < .480F$$
$$.120F < (Va)\ t_7 < .140F$$
$$.170F < (Vb)\ t_8 < .190F$$
$$.140F < (VIa)\ t_9 < .160F$$
$$.270F < (VIb)\ t_{10} < .290F$$
$$.189F < (VII)\ t_{11} < .231F$$
$$.138F < (VIII)\ t_{12} < .182F$$
$$.289F < (IX)\ t_{13} < .331F$$
$$.168F < (X)\ t_{14} < .212F$$
$$.168F < (XI\ t_{15} < .212F$$

the range of values in terms of F for said successive axial spaces $S_1$ to $S_{11}$ being given in the table herebelow, $$.301F < S_1 < .310F$$
$$.0314F < S_2 < .0374F$$
$$.298F < S_3 < .312F$$
$$.0333F < S_4 < .0543F$$
$$.545F < S_5\ (102\times) < .565F$$
$$3.015F < S_5\ (200\times) < 3.045F$$
$$3.76F < S_5\ (300\times) < 3.80F$$
$$4.33F < S_5\ (500\times) < 4.37F$$
$$4.12F < S_6\ (102\times) < 4.16F$$
$$3.31F < S_6\ (200\times) < 3.33F$$
$$2.43F < S_6\ (300\times) < 2.47F$$
$$.82F < S_6\ (500\times) < .84F$$
$$3.09F < S_7\ (102\times) < 3.12F$$
$$1.36F < S_7\ (200\times) < 1.38F$$
$$1.47F < S_7\ (300\times) < 1.50F$$
$$2.52F < S_7\ (500\times) < 2.56F$$
$$2.00F < S_8 < 2.04F$$
$$14.02F < S_9 < 14.57F$$
$$3.02F < S_{10} < 3.15F$$
$$.0052F < S_{11} < .0156F$$

and the ranges of absolute values for the refractive indices and the Abbé numbers which are designated $n_D$ and $\nu$ respectively and which are related to the successive lens elements I to XI being given in the chart herebelow,

| Element | $n_D$ | $\nu$ |
|---|---|---|
| I | 1.618 to 1.622 | 59.8 to 60.8. |
| II | 1.513 to 1.515 | 69.7 to 70.7. |
| IIIa | 1.689 to 1.693 | 30.4 to 31.0. |
| IIIb | 1.513 to 1.515 | 69.7 to 70.7. |
| IVa | 1.718 to 1.722 | 29.1 to 29.5. |
| IVb | 1.513 to 1.515 | 69.7 to 70.7. |
| Va | 1.621 to 1.625 | 56.4 to 57.4. |
| Vb | 1.749 to 1.753 | 27.6 to 28.0. |
| VIa | 1.689 to 1.693 | 30.4 to 31.0. |
| VIb | 1.522 to 1.524 | 54.6 to 55.6. |
| VII | 1.618 to 1.622 | 59.8 to 60.8. |
| VIII | 1.540 to 1.542 | 46.9 to 47.7. |
| IX | 1.749 to 1.753 | 27.6 to 28.0. |
| X and XI | 1.515 to 1.518 | 64.0 to 65.0. |

4. A zoom type optical system for a microscope including a front stationary lens group having a focal length per se designated by F, a movable zoom lens group for continuously varying the magnification of the image formed by the first group, said movable group located next in order to the front group, a stationary relay lens group located to receive the image rays from the zoom lens group, and an eyepiece for focusing said rays and presenting a visible image to the operator, the successive lens groups cooperatively forming an image of variable size from substantially 100× to 500× having excellent imaging quality, particularly with regard to flatness of field and the chromatic and monochromatic aberrations thereof, said front stationary lens group comprising a foremost positive meniscus lens designated I which is spaced away from an adjacent specimen cover glass surface at an axial distance designated $S_1$ and is followed by a second positive meniscus lens II, the intervening axial distance being designated $S_2$, a first positive doublet lens III spaced at an axial distance $S_3$ from lens II and a second positive doublet lens IV spaced at an axial distance $S_4$ from lens III, doublet lens III being composed of a front negative element IIIa which lies in contact with a rear positive element IIIb, and doublet lens IV having a front negative element IVa and a rear positive element IVb, said zoom lens group comprising a negative doublet lens designated V located at a variable axial distance $S_5$ from lens IV, and a positive doublet lens designated VI located at a variable axial distance $S_6$ from lens V, doublet lens V having a front negative element Va lying in contact with a positive rear element Vb, and the doublet lens VI being composed of a front negative element VIa and a rear positive element VIb, said stationary relay lens group comprising a positive lens VII which is spaced at a variable axial distance $S_7$ from lens VI and further comprises a negative lens VIII spaced at a fixed axial distance $S_8$ from lens VII, said eyepiece comprising a front convex plano lens IX spaced rearwardly of lens VIII at an axial distance $S_9$, and further comprising a pair of similar convex plano lenses X and XI, lens X being spaced at an axial distance $S_{10}$ from lens IX and being spaced from lens XI at a distance $S_{11}$, the ranges of values in terms of F for the successive radii designated $-R_1$ to $R_{26}$ of the lenses I to XI being given in the table herebelow wherein the minus (—) sign means that the designated surface is concave toward the front, $.911F < -R_1 < .922F$
$.633F < -R_2 < .635F$
$2.706F < -R_3 < 2.726F$
$1.142F < -R_4 < 1.144F$
$5.441F < R_5 < 5.499F$
$1.533F < R_6 < 1.536F$
$3.506F < -R_7 < 3.524F$
$4.453F < R_8 < 4.481F$
$1.373F < R_9 < 1.375F$
$2.864F < -R_{10} < 2.878F$
$1.975F < -R_{11} < 1.998F$
$.984F < R_{12} < .988F$
$2.414F < R_{13} < 2.450F$
$17.282F < R_{14} < 18.282F$
$2.758F < R_{15} < 2.776F$
$2.758F < -R_{16} < 2.776F$
$16.286F < R_{17} < 16.752F$
$16.286F < -R_{18} < 16.752F$
$12.856F < -R_{19} < 13.146F$
$12.856F < -R_{20} < 13.146F$
$3.323F < R_{21} < 3.329F$
$/R_{22}/ > 50.0F$
$1.743F < R_{23} < 1.749F$
$/R_{24}/ > 50.0F$
$1.743F < R_{25} < 1.749F$
$/R_{26}/ > 50.0F$ the ranges of values for the axial thicknesses designated $t_1$ to $t_{15}$ of the successive lens elements of the respective lenses I to XI being given in the table below, $.585F < (I) \ t_1 < .595F$
$.273F < (II) \ t_2 < .287F$
$.170F < (IIIa) \ t_3 < .190F$
$.350F < (IIIb) \ t_4 < .370F$
$.170F < (IVa) \ t_5 < .190F$
$.460F < (IVb) \ t_6 < .480F$
$.120F < (Va) \ t_7 < .140F$
$.170F < (Vb) \ t_8 < .190F$
$.140F < (VIa) \ t_9 < .160F$
$.270F < (VIb) \ t_{10} < .290F$
$.189F < (VII) \ t_{11} < .231F$
$.138F < (VIII) \ t_{12} < .182F$
$.289F < (IX) \ t_{13} < .331F$
$.168F < (X) \ t_{14} < .212F$
$.168F < (XI) \ t_{15} < .212F$ the range of values for said successive axial spaces $S_1$ to $S_{11}$ being given in the table herebelow, $.301F < S_1 < .310F$
$.0314F < S_2 < .0374F$
$.298F < S_3 < .312F$
$.0333F < S_4 < .0543F$
$.545F < S_5 \ (102 \times) < .565F$
$3.015F < S_5 \ (200 \times) < 3.045F$
$3.76F < S_5 \ (300 \times) < 3.80F$
$4.33F < S_5 \ (500 \times) < 4.37F$
$4.12F < S_6 \ (102 \times) < 4.16F$
$3.31F < S_6 \ (200 \times) < 3.33F$
$2.43F < S_6 \ (300 \times) < 2.47F$
$.82F < S_6 \ (500 \times) < .84F$
$3.09F < S_7 \ (102 \times) < 3.12F$
$1.36F < S_7 \ (200 \times) < 1.38F$
$1.47F < S_7 \ (300 \times) < 1.50F$
$2.52F < S_7 \ (500 \times) < 2.56F$
$2.00F < S_8 < 2.04F$
$14.02F < S_9 < 14.57F$
$3.02F < S_{10} < 3.15F$
$.0052F < S_{11} < .0156F$ and the ranges of absolute values for the refractive indices and the Abbe numbers which are designated $n_D$ and $\nu$ respectively and which are related to the successive elements I to XI being given in the chart herebelow,

| Element | $n_D$ | $\nu$ |
|---|---|---|
| I | 1.618 to 1.622 | 59.8 to 60.8. |
| II | 1.513 to 1.515 | 69.7 to 70.7. |
| IIIa | 1.689 to 1.693 | 30.4 to 31.0. |
| IIIb | 1.513 to 1.515 | 69.7 to 70.7. |
| IVa | 1.718 to 1.722 | 29.1 to 29.5. |
| IVb | 1.513 to 1.515 | 69.7 to 70.7. |
| Va | 1.621 to 1.625 | 56.4 to 57.4. |
| Vb | 1.749 to 1.753 | 27.6 to 28.0. |
| VIa | 1.689 to 1.693 | 30.4 to 31.0. |
| VIb | 1.522 to 1.524 | 54.6 to 55.6. |
| VII | 1.618 to 1.622 | 59.8 to 60.8. |
| VIII | 1.540 to 1.542 | 46.9 to 47.7. |
| IX | 1.749 to 1.753 | 27.6 to 28.0. |
| X and XI | 1.515 to 1.518 | 64.0 to 65.0. |

5. A zoom type optical system for a microscope including a front stationary lens group having a focal length per se designated by F.

a movable zoom lens group for continuously varying the magnification of the image formed by the first group, said movable group located next in order to the front group, a stationary relay lens group located to receive the image rays from the zoom lens group, and an eyepiece for focusing said rays and presenting a visible image to the operator, the successive lens group cooperatively forming an image of variable size from 100X to 500X having excellent imaging quality, particularly with regard to flatness of field and the chromatic and monochromatic aberrations thereof, said front stationary lens group comprising a foremost positive meniscus lens designated I which is spaced away from an adjacent specimen cover glass object surface at an axial distance designated $S_1$ and is followed by a second positive meniscus lens II, the intervening axial distance being designated $S_2$, a first positive doublet lens III spaced at an axial distance $S_3$ from lens II and a second positive doublet lens IV spaced at an axial distance $S_4$ from lens III, doublet lens III being composed of a front negative element IIIa which lies in contact with a rear positive element IIIb, and doublet lens IV having a front negative element IVa and rear positive element IVb, said zoom lens group comprising a negative doublet lens designated V located at a variable axial distance $S_5$ from lens IV, and a positive doublet lens designated VI located at a variable axial distance $S_6$ from lens V, doublet lens V having a front negative element Va lying in contact with a positive rear element Vb, and the doublet lens VI being composed of a front negative element VIa and a rear positive element VIb, said stationary relay lens group comprising a positive lens VII which is spaced at a variable axial distance $S_7$ from lens VI and further comprises a negative lens VIII spaced at a fixed axial distance $S_8$ from lens VII, said eyepiece comprising a front convex plano lens IX spaced rearwardly of lens VIII at an axial distance $S_9$, and further comprising a pair of similar convex plano lenses X and XI, lens X being spaced at an axial distance $S_{10}$ from lens IX and being spaced from lens XI at a distance $S_{11}$, the equivalent focal length of each successive lens from I to XI being designated by F (I) to F (XI) respectively and being stated in specific values in terms of F which represents the equivalent focal length of the stationary lens group I to IV per se, in the table hereinbelow, the minus (—) sign therein meaning negative focal length, $F(I) = 1.84F$
$F(II) = 3.62F$
$F(III) = 6.40F$
$-F(IIIa) = 3.15F$
$F(IIIb) = 2.13F$
$F(IV) = 5.29F$
$-F(IVa) = 2.82F$
$F(IVb) = 1.88F$
$-F(V) = 1.99F$
$-F(Va) = 1.04F$
$F(Vb) = 2.10F$
$F(VI) = 5.96F$
$-F(VIa) = 4.76F$
$F(VIb) = 2.69F$
$F(VII) = 13.35F$
$-F(VIII) = 11.99F$
$F(IX) = 4.43F$
$F(X) = 3.38F$
$F(XI) = 3.38F$ the specific values in terms of F for the axial thicknesses which are designated $t_1$ to $t_{15}$ of the successive lens elements I to XI being given in the table herebelow, (I) $t_1 = .59F$
(II) $t_2 = .28F$
(IIIa) $t_3 = .18F$
(IIIb) $t_4 = .36F$
(IVa) $t_5 = .18F$
(IVb) $t_6 = .47F$
(Va) $t_7 = .13F$
(Vb) $t_8 = .18F$
(VIa) $t_9 = .15F$
(VIb) $t_{10} = .28F$
(VII) $t_{11} = .21F$
(VIII) $t_{12} = .16F$
(IX) $t_{13} = .31F$
(X) $t_{14} = .19F$
(XI) $t_{15} = .19F$ the specific values in terms of F for the successive axial airspaces $S_1$ to $S_{11}$ being given substantially in the table herebelow, $S_1 = .305F$
$S_2 = .0344F$
$S_3 = .305F$
$S_4 = .0438F$
(102×) $S_5 = .555F$
(200×) $S_5 = 3.03F$
(300×) $S_5 = 3.78F$
(500×) $S_5 = 4.35F$
(102×) $S_6 = 4.14F$
(200×) $S_6 = 3.32F$
(300×) $S_6 = 2.45F$
(500×) $S_6 = .833F$
(102×) $S_7 = 3.11F$
(200×) $S_7 = 1.37F$
(300×) $S_7 = 1.49F$
(500×) $S_7 = 2.54F$
$S_8 = 2.017F$
$S_9 = 14.293F$
$S_{10} = 3.085F$
$S_{11} = .0104F$ 6. A zoom type optical system for a microscope including a front stationary lens group having a focal length per se designated by F,
- a movable zoom lens group for continuously varying the magnification of the image formed by the first group, said movable group located next in order to the front group,
- a stationary relay lens group located to receive the image rays from the zoom lens group, and
- an eyepiece for focusing said rays and presenting a visible image to the operator,
- the successive lens groups cooperatively forming an image of variable size from 100X to 500X having excellent imaging quality, particularly with regard to flatness of field and the chromatic and monochromatic aberrations thereof,
- said front stationary lens group comprising a foremost positive meniscus lens designated I which is spaced away from an adjacent specimen cover glass surface at an axial distance designated $S_1$ and is followed by a second positive meniscus lens II, the intervening axial distance being designated $S_2$, a first positive doublet lens III spaced at an axial distance $S_3$ from lens II and a second positive doublet lens IV spaced at an axial distance $S_4$ from lens III, doublet lens III being composed of a front negative element IIIa which lies in contact with a rear positive element IIIb, and doublet lens IV having a front negative element IVa and rear positive element IVb,
- said zoom lens group comprising a negative doublet lens designated V located at a variable axial distance $S_5$ from lens IV, and a positive doublet lens designated VI located at a variable axial distance $S_6$ from lens V, doublet lens V having a front negative element Va lying in contact with a positive rear element Vb, and the doublet lens VI being composed of a front negative element VIa and a rear positive element VIb,
- said stationary relay lens group comprising a positive lens VII which is spaced at a variable axial distance $S_7$ from lens VI and further comprises a negative lens VIII spaced at a fixed distance $S_8$ from lens VII,
- said eyepiece comprising a front convex plano lens IX spaced rearwardly of lens VIII at an axial distance $S_9$, and further comprising a pair of similar convex plano lenses X and XI, lens X being spaced at an axial distance $S_{10}$ from lens IX and being spaced from lens XI at a distance $S_{11}$,
- the specific values in terms of F for the successive radii designated $-R_1$ to $R_{26}$ of the lens members I to XI being given in the table herebelow wherein the minus (—) sign means that the designated surface is concave toward the front, Lens I
$-R_1 = .916F$
$-R_2 = .634F$ Lens II
$-R_3 = 2.716F$
$-R_4 = 1.143F$ Lens III
$R_5 = 5.470F$
$R_6 = 1.534F$
$-R_7 = 3.515F$ Lens IV
$R_8 = 4.467F$
$R_9 = 1.374F$
$-R_{10} = 2.871F$ Lens V
$-R_{11} = 1.986F$
$R_{12} = 0.986F$
$R_{13} = 2.432F$ Lens VI
$R_{14} = 17.782F$
$R_{15} = 2.767F$
$-R_{16} = 2.767F$ Lens VII
$R_{17} = 16.519F$
$-R_{18} = 16.519F$ Lens VIII
$-R_{19} = 13.001F$
$R_{20} = 13.001F$ Lens IX
$R_{21} = 3.326F$
$R_{22} = $ Plano Lens X
$R_{23} = 1.746F$
$R_{24} = $ Plano Lens XI
$R_{25} = 1.746F$
$R_{26} = $ Plano the specific values in terms of F for the axial thicknesses which are designated $t_1$ to $t_{15}$ of the successive lens elements I to XI being given in the table herebelow, (I) $t_1 = .59F$
(II) $t_2 = .28F$
(IIIa) $t_3 = .18F$
(IIIb) $t_4 = .36F$
(IVa) $t_5 = .18F$
(IVb) $t_6 = .47F$
(Va) $t_7 = .13F$
(VB) $t_8 = .18F$
(VIa) $t_9 = .15F$
(VIb) $t_{10} = .28F$
(VII) $t_{11} = .21F$
(VIII) $t_{12} = .16F$
(IX) $t_{14} = .19F$
(X) $t_{14} = .19F$
(XI) $t_{15} = .19F$ the specific values in terms of F for the successive airspaces $S_1$ to $S_{11}$ being given substantially in the table herebelow, $S_1 = .305F$
$S_2 = .0344F$
$S_3 = .305F$
$S_4 = .0438F$
(102×) $S_5 = .555F$
(200×) $S_5 = 3.03F$
(300×) $S_5 = 3.78F$
(500×) $S_5 = 4.35F$
(102×) $S_6 = 4.14F$
(200×) $S_6 = 3.32F$
(300×) $S_6 = 2.45F$
(500×) $S_6 = .833F$
(102×) $S_7 = 3.11F$
(200×) $S_7 = 1.37F$
(300×) $S_7 = 1.49F$
(500×) $S_7 = 2.54F$ $S_8 = 2.017F$
$S_9 = 14.293F$
$S_{10} = 3.085F$
$S_{11} = .0104F$ the specific absolute values for the refractive indices and the Abbe numbers which are designated $n_D$ and $\nu$ respectively related to the successive lens elements I to XI being given substantially in the table herebelow, $\nu(I) = 60.3$  $n_D(I) = 1.620$
$\nu(II) = 70.2$  $n_D(II) = 1.514$
$\nu(IIIa) = 30.7$  $n_D(IIIa) = 1.691$
$\nu(IIIb) = 70.2$  $n_D(IIIb) = 1.514$
$\nu(IVa) = 29.3$  $n_D(IVa) = 1.720$
$\nu(IVb) = 70.2$  $n_D(IVb) = 1.514$
$\nu(Va) = 56.9$  $n_D(Va) = 1.623$
$\nu(Vb) = 27.8$  $n_D(Vb) = 1.7506$
$\nu(VIa) = 30.7$  $n_D(VIa) = 1.691$
$\nu(VIb) = 55.1$  $n_D(VIb) = 1.5235$
$\nu(VII) = 60.3$  $n_D(VII) = 1.620$
$\nu(VIII) = 47.3$  $n_D(VIII) = 1.541$
$\nu(IX) = 27.8$  $n_D(IX) = 1.7506$
$\nu(X) = 64.5$  $n_D(X) = 1.517$

References Cited

UNITED STATES PATENTS 3,353,891  11/1967  Rosenberger.
3,360,327  12/1967  Rosenberger et al.

DAVID SCHONBERG, Primary Examiner

T. H. KUSMER, Assistant Examiner

U.S. Cl. X.R.

350—184

UNITED STATES PATENT OFFICE
CERTIFICATE OF CORRECTION

Patent No. 3,456,998          Dated July 22, 1969

Inventor(s) Harold E. Rosenberger et al.

It is certified that error appears in the above-identified patent and that said Letters Patent are hereby corrected as shown below:

Column 4, lines 65-66 should read -- $/R_{22}/>50.0F$ --; lines 66-67 should read -- $/R_{24}, R_{26}/>50.0F$ --. Column 6, before "TABLE VIII" insert -- The specific values in terms of F of the successive lens surfaces designated -$R_1$ to $R_{26}$ of the lenses I to XI are given in the TABLE VIII herebelow wherein the minus (-) sign means that such a surface is concave toward the front, --; lines 42-47 should be deleted; Column 7, line 21, "$C_{10}$" should read -- $S_{10}$ --; line 68, ".031F" should read -- .0314F --. Column 11, line 8, "$R_3$" should read -- $R_8$ --; line 20, " -$R_{20}$" should read -- $R_{20}$ --. Column 14, line 51, "(IX) $t_{14}$ = .19F" should read -- (IX) $t_{13}$ = .31F --.

Signed and sealed this 24th day of November 1970.

(SEAL)
Attest:

EDWARD M. FLETCHER, JR.          WILLIAM E. SCHUYLER, JR.
Attesting Officer                Commissioner of Patents